US 10,831,899 B2

(12) United States Patent
Bezzi et al.

(10) Patent No.: US 10,831,899 B2
(45) Date of Patent: Nov. 10, 2020

(54) SECURITY-RELEVANT CODE DETECTION SYSTEM

(71) Applicant: SAP SE, Walldorf (DE)

(72) Inventors: Michele Bezzi, Valbonne (FR); Antonino Sabetta, Mouans Sartoux (FR); Henrik Plate, Valbonne (FR); Serena Ponta, Antibes (FR)

(73) Assignee: SAP SE, Walldorf (DE)

( * ) Notice: Subject to any disclaimer, the term of this patent is extended or adjusted under 35 U.S.C. 154(b) by 260 days.

(21) Appl. No.: 15/978,691

(22) Filed: May 14, 2018

(65) Prior Publication Data
US 2019/0347424 A1 Nov. 14, 2019

(51) Int. Cl.
*G06F 21/57* (2013.01)
*G06N 20/00* (2019.01)

(52) U.S. Cl.
CPC ........... *G06F 21/577* (2013.01); *G06N 20/00* (2019.01)

(58) Field of Classification Search
CPC ....... G06F 21/577; G06F 21/57; G06N 20/00; G06N 99/00; G06N 99/005
See application file for complete search history.

(56) References Cited

U.S. PATENT DOCUMENTS

| | | | |
|---|---|---|---|
| 2012/0201380 A1* | 8/2012 | Kohiyama | G06F 21/123 380/255 |
| 2018/0276562 A1* | 9/2018 | Woulfe | G06N 3/0445 |
| 2019/0287029 A1* | 9/2019 | Sobran | G06N 20/00 |

OTHER PUBLICATIONS

Antoniol, Giuliano, et al., "Is it a Bug or an Enhancement? A Text-based Approach to Classify Change Requests", Natural Sciences and Engineering Research Council of Canada, G. Antoniol NSERC Discovery Grant, 15 pgs (Year: 2008).*

Zhou, Yaqin, et al., "Automated Identification of Security Issues from Commit Messages and Bug Reports", In Proceedings of 11th Joint Meeting of the European Software Engineering Conference and the ACM SIGSOFT Symposium on the Foundations of Software Engineering. ing, (2017), 914-919 (Year: 2017).*

"2016 Cost of Data Breach Study: Global Analysis. Technical Report.", Ponemon Institute LLC, (Jun. 2016), 1-32.

(Continued)

*Primary Examiner* — Eleni A Shiferaw
*Assistant Examiner* — Stephanie S Ham
(74) *Attorney, Agent, or Firm* — Schwegman Lundberg & Woessner, P.A.

(57) ABSTRACT

Systems and methods are provided for retrieving a set of code changes to source code from a source code repository, analyzing the set of code changes to generate a vector representation of each code change of the set of code changes, analyzing the vector representation of each code change of the set of code changes using a trained security-relevant code detection machine learning model, receiving a prediction from the security-relevant code detection machine learning model representing a probability that each code change of the set of code changes contains security-relevant changes, analyzing the prediction to determine whether the prediction is below or above a predetermined threshold, and generating results based on determining whether the prediction is below or above a predetermined threshold.

18 Claims, 9 Drawing Sheets

(56) References Cited

OTHER PUBLICATIONS

Antoniol, Giuliano, et al., "Is it a Bug or an Enhancement? A Text-based Approach to Classify Change Requests", This research was partially supported by the Natural Sciences and Engineering Research Council of Canada (Research Chair in Software Evolution #950-202658) and by G. Antoniol NSERC Discovery Grant, (2008), 15 pgs.

Huang, Yuan, et al., "Mining Version Control System for Automatically Generating Commit Comment", IEEE International Symposium on Empirical Software Engineering and Measurement., (2017), 414-423.

Levin, Stanislav, et al., "Boosting Automatic Commit Classification Into Maintenance Activities by Utilizing Source Code Changes", Proceedings of the 13th International Conference on Predictive Models and Data Analytics in Software Engineering, (Nov. 14, 2017), 97-106.

Plate, Henrik, et al., "Impact assessment for vulnerabilities in open-source software libraries", Software Maintenance and Evolution (ICSME), 2015 IEEE International Conference, (2015), 411-420.

Zhou, Yaqin, et al., "Automated identification of Security issues from Commit Messagee and Bug Reports", In Proceedings of 11th Joint Meeiing of the European Software Engineering Conference and the ACM SIGSOFT Symposium on the Foundations of Software Engineering. ing, (2017), 914-919.

"Open Source Security and Risk Analysis Report", Technical report, Black Duck, (2017), 1-14.

\* cited by examiner

SECURITY-RELEVANT CODE DETECTION SYSTEM

BACKGROUND

Today's software industry faces the difficult challenge of reconciling the opportunity represented by the availability of mature, high-quality of Open-Source Software (OSS) components with the need to maintain a secure software supply chain and an effective vulnerability management process. To achieve this goal, the sources of vulnerability information should be consistent, timely, and reliable. In particular, in order for advanced vulnerability management technology to work, detailed information about the security fix must be available, down to the level of which lines of code and which methods need to be updated in order to patch the vulnerability. Unfortunately, the current de-facto standard sources of such information (e.g., the National Vulnerability Database) lack all these characteristics. Also, it is not uncommon for OSS projects to fix security defects just by committing a code change to their repository and without issuing a corresponding advisory. These "silent" fixes are a danger to the enterprise products because their urgency is difficult to appreciate and typically underestimated.

BRIEF DESCRIPTION OF THE DRAWINGS

Various ones of the appended drawings merely illustrate example embodiments of the present disclosure and should not be considered as limiting its scope.

FIG. 6-7 illustrate example user interfaces, according to some example embodiments.

DETAILED DESCRIPTION

Figure 1:
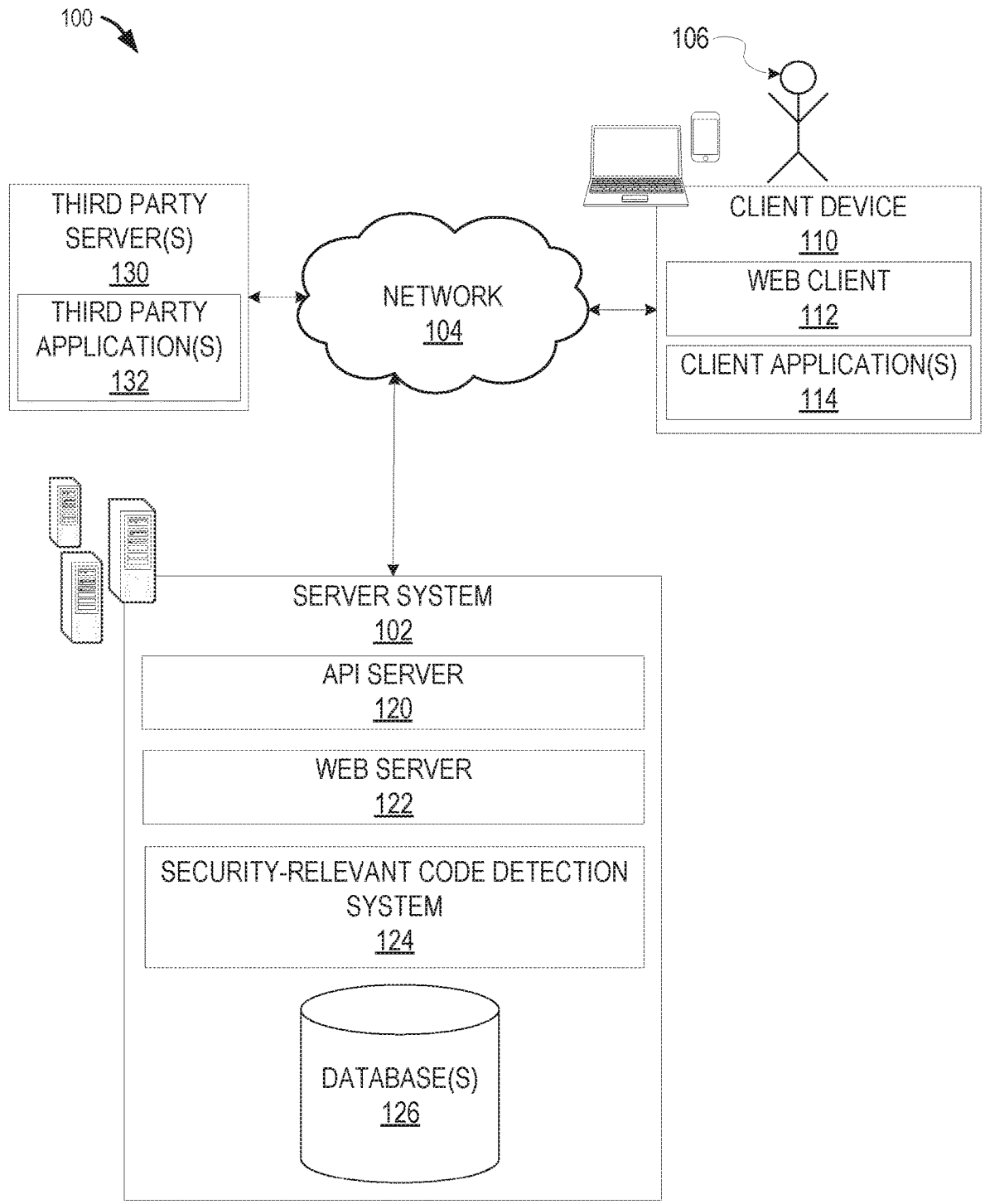
FIG. 1 is a block diagram illustrating a networked system, according to some example embodiments.

Systems and methods described herein relate to identifying security-relevant code changes. Example embodiments use machine-learning techniques to extract information directly from source code repositories and to identify code changes (also referred to as "commits" or "code commits" or "fixes") that are security-relevant. For example, example embodiments examine individual code commits and treat the code changes as ordinary text. The code changes are thus expressed as a document (e.g., made of words) to which text-classification methods may be applied. Example embodiments may be implemented using Logistic Regression and Support Vector Machine (SVM) classifiers, or any supervised learning model including Deep Neural Networks (DNN) models, such as those yielding word embeddings, in some example embodiments.

The adoption of open-source software (OSS) components in commercial products is nowadays a consolidated practice in the software industry. According to recent studies, as much as 80% of the code of the average commercial product comes from OSS. By incorporating community-developed functionalities, commercial vendors reduce dramatically development and maintenance costs. The downside of this practice is that security vulnerabilities that affect OSS components are inherited by the products that embed them.

Security vulnerabilities result in attacks, which have a significant monetary cost for industries and society (around 4 million dollars on average per incident, up about 30% from 2013, according to a recent report), with open source playing a major role in these vulnerabilities. In fact, an estimated 20% increase in the number of attacks is related to open source vulnerabilities, and an analysis of more than 1000 applications shows that 96% of the analyzed commercial solutions contained open source code, and with more than 60% containing open source security vulnerabilities.

To address this problem, software vendors are establishing processes to ensure that their entire software supply chain is secured. These processes include tracking and monitoring all the OSS components imported, evaluating the relevance and impact of each vulnerability, and reacting to vulnerability disclosures with the timely application of patches.

Despite these efforts, maintaining a healthy code base is still a challenging task that to a large extent relies on manual work. Indeed, the number of OSS components included in even moderately sized projects can be unwieldy. While the direct dependencies of a software project can be just a few dozen, these, in turn, bring into the project additional transitive dependencies. As a result, it is not unusual for an enterprise application to embed more than a thousand OSS components. The large amount of legacy software that is already in operation and that includes OSS components whose identity and version is not systematically tracked makes things even worse.

A fundamental problem of open-source vulnerability management is the lack of consistent, comprehensive, and accurate sources of information. The de-facto reference is the National Vulnerability Database (NVD) which is maintained by Mitre. The NVD, however, lacks all these characteristics. In particular. NVD advisories (CVEs) do not consistently provide the information about how the vulnerability at hand was fixed at the code level.

Given the decentralized nature of the OSS community, consistency in the way vulnerability data is produced and collected is inherently difficult. To make the situation worse, it is well known that certain projects silently fix issues (including security issues) without advertising them fixing security issues. This means that vulnerability advisories are not covering as many security defects as one would expect, making it harder (if even possible) for the consumers of those projects to assess the urgency of upgrades, since it is not possible to reliably distinguish upgrades that only bring features and functional improvements from those that (also) contain fixes for security issues.

Still, advanced vulnerability management technology (e.g., such as a tool to detect, assess, and mitigate vulnerabilities in open-source software components used in large enterprise applications) relies on the availability of detailed information about the security fix down to the level of which lines of code and which methods need to be updated in order to patch the vulnerability. Extracting this information is currently a difficult, tedious, time-consuming, and error-prone process.

Example embodiments described herein address technical problems such as those outlined above. For example, in order to cope with the problems outlined in the previous section, example embodiments provide a novel method that uses machine-learning techniques to extract the needed information directly from source code repositories, without relying on external vulnerability databases (such as the NVD). Example embodiments treat the textual content of individual code changes (e.g., commits) as ordinary text, and thus, code changes are expressed as a document (e.g., bag of words) to which automated text-classification methods can be applied. This is based on the premise that a choice of identifier names (e.g., the terms that the developer uses to name classes, methods, variables) may be an essential means to convey semantics. This premise leads to the example embodiments which treat the source code changes themselves as a plain text document, and thus reduce the problem of classifying code changes to a document classification problem.

In order to do so, a set of code changes (e.g., patches) found in the entire history (or in a defined temporal interval) of a given project is considered and each of them is processed in order to extract a set of terms. Then, standard document classification methods are used to train a standard classifier (e.g., using algorithms such as Naive Bayes, Logistic Regression, Support Vector Machines, and the like) to recognize patches that appear to be "security-relevant" based on the terms that they contain.

FIG. 1 is a block diagram illustrating a networked system 100, according to some example embodiments, configured to detect security-relevant code changes in source code. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to request detection of security-relevant code changes (e.g., by a user such as a security expert, a developer, or the like), to implement a security-relevant code detection machine learning model (e.g., by a user such as a data scientist, or the like), to receive and display results from a security-relevant code detection system, and so forth.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., third-party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, a security-relevant code detection system application, and the like.

In some embodiments, one or more client applications 114 may be included in a given one of the client device 110, and configured to locally provide the user interface and at least some of the functionalities, with the client application 114 configured to communicate with other entities in the system 100 (e.g., third-party servers 130, server system 102, etc.), on an as needed basis, for data and/or processing capabilities not locally available (e.g., access location information, access software version information, to generate results of security-relevant code detection, to authenticate a user 106, to verify a method of payment, etc.). Conversely, one or more applications 114 may not be included in the client device 110, and then the client device 110 may use its web browser to access the one or more applications hosted on other entities in the system 100 (e.g., third-party servers 130, server system 102, etc.).

A server system 102 may provide server-side functionality via the network 104 (e.g., the Internet or wide area network (WAN)) to one or more third-party servers 130 and/or one or more client devices 110. The server system 102 may include an application program interface (API) server 120, a web server 122, and security-relevant code detection system 124, that may be communicatively coupled with one or more databases 126.

The one or more databases 126 may be storage devices that store data related to source code, machine learning model training data, results of security-relevant code detection, and so forth. The one or more databases 126 may further store information related to third-party servers 130, third-party applications 132, client devices 110, client applications 114, users 106, and so forth. The one or more databases 126 may be cloud-based storage.

The server system 102 may be a cloud computing environment, according to some example embodiments. The server system 102, and any servers associated with the server system 102, may be associated with a cloud-based application, in one example embodiment.

The security-relevant code detection system 124 may provide back-end support for third-party applications 132 and client applications 114, which may include cloud-based applications. The security-relevant code detection system 124 may process requests for security-relevant code detection, generate and provide results of security-relevant code detection, train and test machine learning models, and so forth as described in further detail below. The security-relevant code detection system 124 may comprise one or more servers or other computing devices or systems.

The system 100 may further include one or more third-party servers 130. The one or more third-party servers 130 may include one or more third-party application(s) 132. The one or more third-party application(s) 132, executing on third-party server(s) 130, may interact with the server system 102 via API server 120 via a programmatic interface provided by the API server 120. For example, one or more the third-party applications 132 may request and utilize information from the server system 102 via the API server 120 to support one or more features or functions on a website hosted by the third party or an application hosted by the third party. The third-party website or application 132, for example, may provide software version analysis functionality that is supported by relevant functionality and data in the server system 102.

Figure 2:
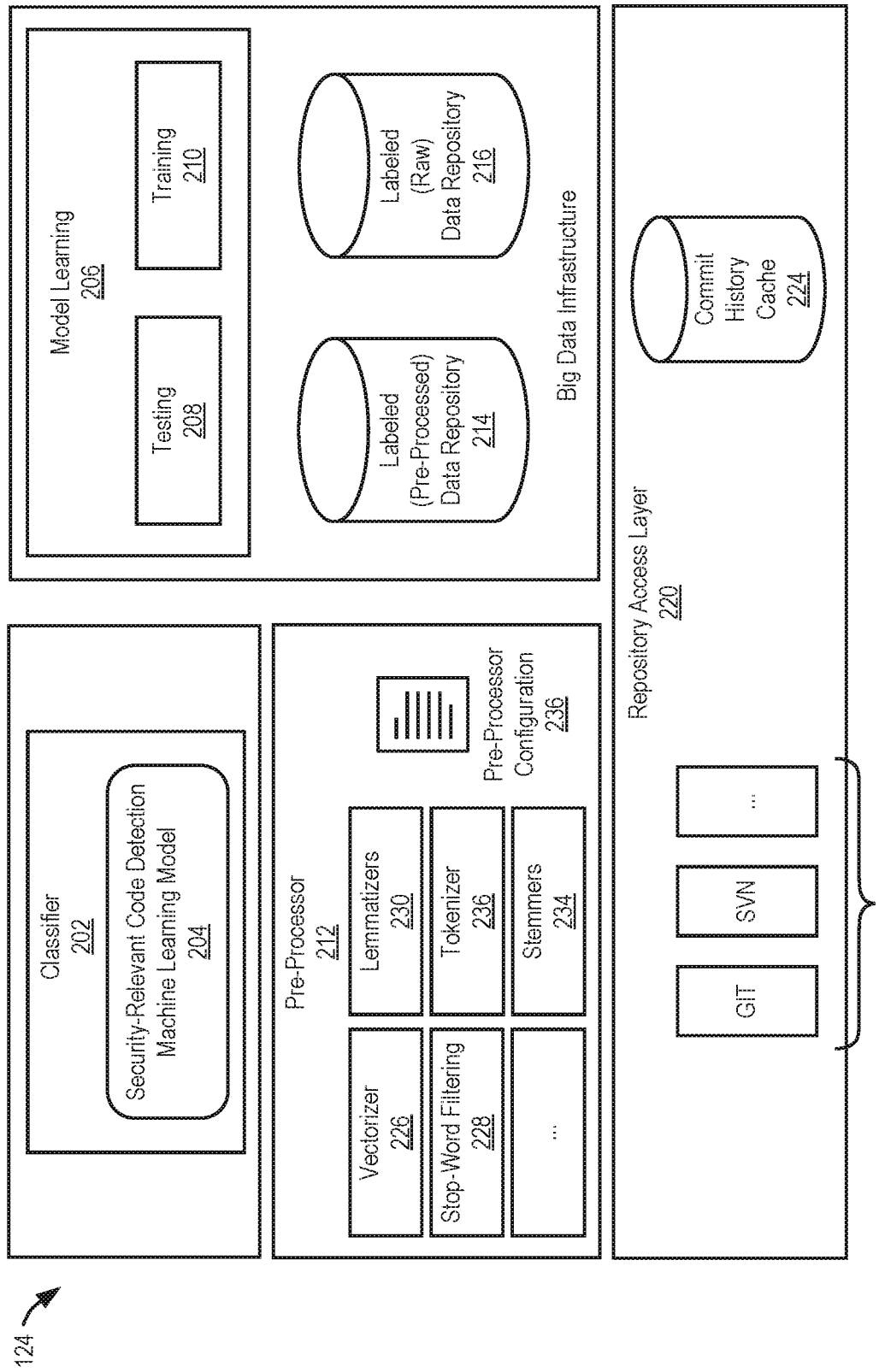
FIG. 2 is a block diagram illustrating a security-relevant code detection system, according to some example embodiments.

FIG. 2 is a block diagram illustrating further details of the security-relevant code detection system 124, according to some example embodiments. As described above, the security-relevant code detection system 124 may comprise one or more server computers or other computing device or system. A user via a computing device (e.g., client device 110) may interact with the security-relevant code detection system 124 via API server 120 (shown in FIG. 1), in one example. The API server 120 may expose two main operations, learning and classification.

The security-relevant code detection system 124 includes a model learning component 206. The model learning component 206 trains and tests one or more classifiers (e.g., security-relevant code detection machine learning model 204) with labeled data. The model learning component 206 has two main sub-components 208 and 210 that may be dedicated to training (210) and testing (208). The model learning component 206 takes as input a labeled (pre-processed) dataset $\mathcal{D}_l = \{\mathcal{D}_l^t, \mathcal{D}_l^v\}$ (from the labeled (pre-processed) data repository 214), split into two sub-sets: $\mathcal{D}_l^t$ for the training operation and $\mathcal{D}_l^v$ for validation. These two sub-components are called in sequence.

The training component 210 performs the training of the classifier, using the training (labeled) data set $\mathcal{D}_l^t$, to train (e.g., find the optimal parameter set for) a classification algorithm (e.g., Logistic Regression. Naive Bayes. Support Vector Machines) to distinguish between code changes that are security relevant and those that are not. The testing component 208 tests the performance of the (trained) classifier. The testing component 208 uses the testing (labeled) dataset $\mathcal{D}_l^v$ to compute the accuracy of the trained classifier.

The labeled (pre-processed) data repository 214 contains pre-processed labeled data $\mathcal{D}_l$ which is the data obtained by applying a series of data preparation operations, as Tokenization. Stemming, and so forth (as performed by the data pre-processor 212) on the raw data (code of fixes or changes), along with the corresponding labels (e.g., security relevant or not). The labeled (raw) data repository 216 contains raw labeled data which comprises the source code of the fixes or changes, along with the corresponding label (e.g., security relevant or not). The data can be obtained by code repository (via the Repository Access Layer), augmented with annotations done by a user such as a security expert.

The pre-processor 212 pre-processes raw data by applying a set of basic text processing methods, such as stemming, lemmatization, tokenization, and so forth, to improve language modeling and ultimately the accuracy of machine-assisted text analysis. The pre-processor 212 can call a set of sub-components (e.g., stemmers 234, lemmatizers 230, tokenizers 236, stop-word filtering 228, and the like), with specific parameters. The parameter set may be stored in the preprocessor configuration file 236 so that the same transformations can be consistently applied for multiple calls of the pre-processor 212.

The classifier 202 comprises the trained security-relevant code detection machine learning model 204. The classifier 202 may be called by a user via a computing device (e.g., client device 110) performing the classification and providing as input the codes changes or code of a fix. The classifier 202, using the trained security-relevant code detection machine learning model 204, and the pre-processed input, returns the predicted class of the codes changes or fix, security related or not.

The repository access layer 220 comprises connectors to access one or more different open-source code repositories 222. This enables the access to the source code of patched ("commits"), which constitute the raw data for the classification. It also comprises a commit history cache 224 repository where commits can be temporarily stored to reduce the number of connections to external repository to improve performance, and possibly to avoid the external repository denying access in the presence of too many repeated connections.

In example embodiments, there may be two main operations: learning and classification. The learning operation is where the security-relevant code detection machine learning model 204 is built (e.g., using machine learning techniques and labeled data, the system 124 determines the optimal parameter set for the model 204 to be used in the classification operation). The learning operation is described with respect to FIG. 3. The classification operation uses the security-relevant code detection machine learning model 204 that is built in the learning operation to categorize code changes as security relevant or not. The classification operation is described with respect to FIG. 4.

Figure 3:
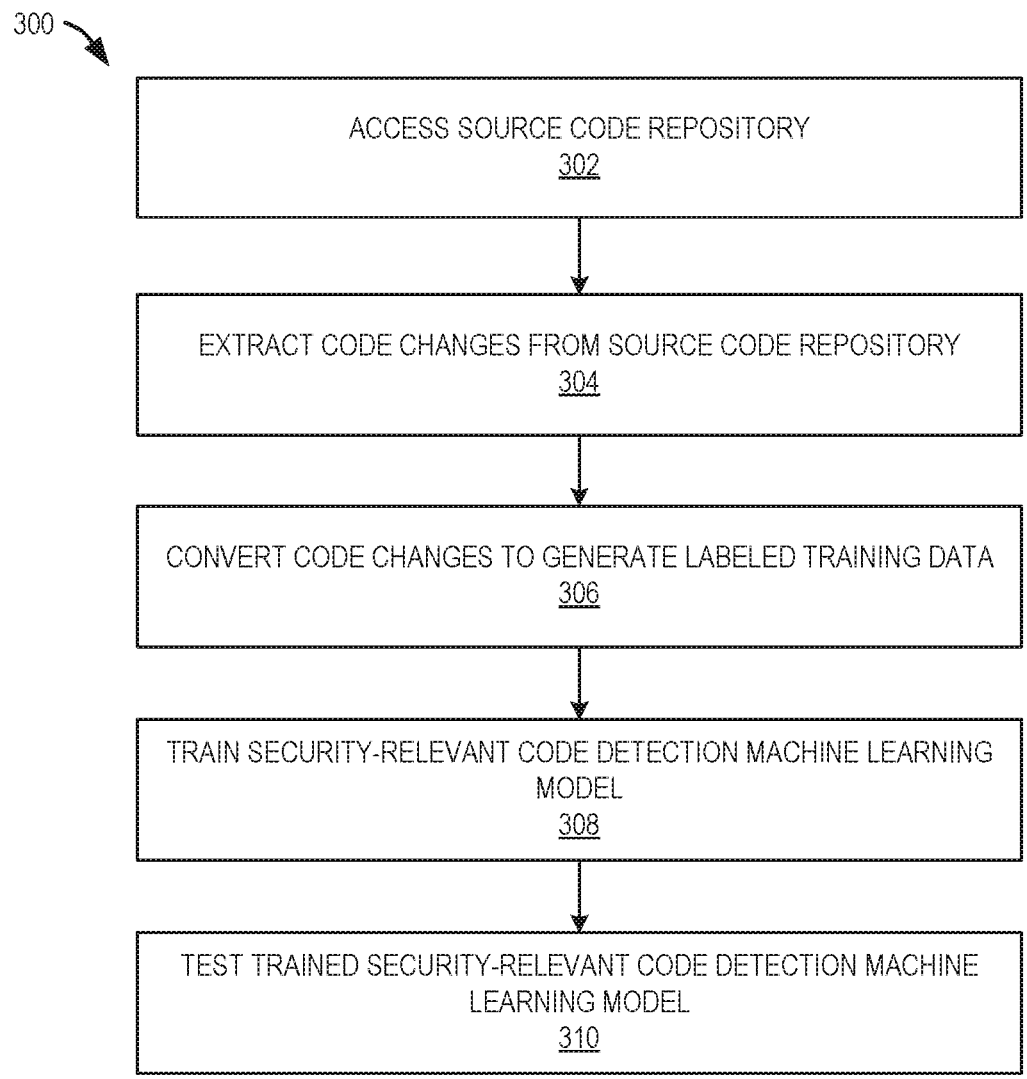
FIG. 3 is flowchart illustrating aspects of a method, according to some example embodiments.

FIG. 3 is a flow chart illustrating aspects of a method 300 for building the security-relevant code detection machine learning model 204, according to some example embodiments. For illustrative purposes, method 300 is described with respect to the networked system 100 of FIG. 1 and example block diagram in FIG. 2 illustrating the security-relevant code detection system 124. It is to be understood that method 300 may be practiced with other system configurations in other embodiments.

In operation 302, one or more processors (e.g., of a computing device or system, such as client device 110, server system 102, security-relevant code detection system 124, or the like) accesses one or more source code repositories. The one or more source code repositories may comprise a plurality of code changes made to the source code. Code changes may also be referred to as code fixes, patches, and the like.

As explained above and shown in FIG. 2, there may be a plurality of source code repositories 222. In one example, the one or more processors may access one or more of the source code repositories 222 directly. In another example, the one or more processors may retrieve and store data from the one or more code repositories in a local cache 224 and access the local cache 224 to access code changes.

In operation 304, the one or more processors extract the plurality of code changes from the one or more source code repository (or local cache). The plurality of code changes are data used to populate the labeled (raw) data repository 216. The data may be obtained by the repository access layer 220 and augmented with annotations (e.g., done by a user such as a security expert) indicating whether the code change is security relevant or not.

In operation 306, the data comprising the plurality of code changes is converted to generate labeled training data for training a security-relevant code detection machine learning model. This operation populates the labeled (pre-processed) data repository 214. The data in the labeled (pre-processed) data repository 214 is pre-processed, for example, using pre-processor functions (e.g., natural language processing) which applies a set of text processing methods (e.g., stemming, lemmatization, tokenization, and the like).

In one example, the one or more processors may convert the code changes to plain text for pre-processing. For example, while the code changes themselves may be in plain text, they may include more than the "terms" used by the developer to denote variables, functions, classes, objects: they also include extra symbols (+,−), and metadata related to the location where the change happened (e.g., file path, line/column numbers, number of characters modified). Also, the one or more processors may deduplicate the content resulting after removing the above spurious elements. Deduplication may be necessary because, for example, when a single word is changed in a line, that line appears twice in the patch: the two copies (prefixed with a − and a + respectively) of the line only differ for the changed word, so all the other words would appear twice. After this "conversion," the one or more processors may apply filtering (remove stop-words) plus all the other technology (stemming, lemmatizing, etc.) as explained above.

The pre-processor functions may be defined in the pre-processor configuration file 236. The output is stored in the labeled (pre-processed) data repository 214. The output may be either the plain-text e.g., (after the 'conversion' described above and the filtering/stemming/lemmatizing, etc.) or that plaintext already represented in a vector space (e.g., word counts, possibly weighted with, e.g., TF-IDF, which is a popular method to give higher weights to words that are specific to one document, and lower weights to very common words). In different embodiments one solution or the other may be adopted.

In one example, it may be worth storing the plaintext, so that it can be readily inspected and the representation to vectors can be tweaked as needed (e.g., to see if certain filters or weight adjustments can have a positive impact on the classification performance); afterwards, when the vectorization process is determined to be satisfactory, the vector representation may be stored, since there may be no value in re-computing it all the time.

The next two operations for building the security-relevant code detection machine learning model 204 are training and validation (e.g., testing). In one example, the labeled (pre-processed data) is split into two sets (e.g., a first subset and a second subset) which are used to train (e.g., training phase) and test (e.g., testing phased) the security-relevant code detection machine learning model 204. In these phases, different machine-learning algorithms (e.g., Logistic Regression, Naive Bayes. Support Vector Machines, and the like) and parameter set are evaluated and the best one (e.g., according to the performance on the test data set) is chosen, and ultimately passed to the classifier 202. If at the end of the training and testing process, the accuracy of the classifier is not satisfactory (e.g., compared to a defined threshold), the two above operations are called again using different parameters (e.g., a different classification algorithm).

Accordingly, in operation 308, the one or more processors trains the security-relevant code detection machine learning model 204 using, for example, a first subset of the labeled training data to generate a trained security-relevant code detection machine learning model. And then in operation 310, the one or more processors tests the trained security-relevant code detection machine learning model using a second subset of the labeled training data. The security-relevant code detection machine learning model 204 may be periodically trained on new data to update the security-relevant code detection machine learning model 204.

Various parameters may be adjusted to obtain the desired classification performance. Class weights, which can be interpreted as the 'misclassification cost' of each class, have a key importance, because adjusting them makes it possible to easily trade recall for precision. The default choice is to assign equal weights to both classes. This choice yields classification performance that is inadequate in practical scenarios, because both precision and recall are low (e.g., below 60%). In typical application scenarios, precision is likely of higher relevance than recall. In other words, it is very important that the false positives are few, whereas it is acceptable to have some false negatives (which should be as few as possible anyway). The inventors studied the effect of different choices for class weights on precision and recall and found that setting them to {'pos': 0.8, 'neg': 0.2} gives precision as high as 97%, with 29% recall. The user of the system can still tweak these weights and, depending on his or her tolerance of false positives, decide what weights would make it possible to have fewer false negatives (at the cost of more false positives).

The above-described learning and testing phase results in a trained security-relevant code detection machine learning model. The trained security-relevant code detection machine learning model may then be used to analyze code changes to generate results indicating whether or not a code change contains security-related changes.

Figure 4:
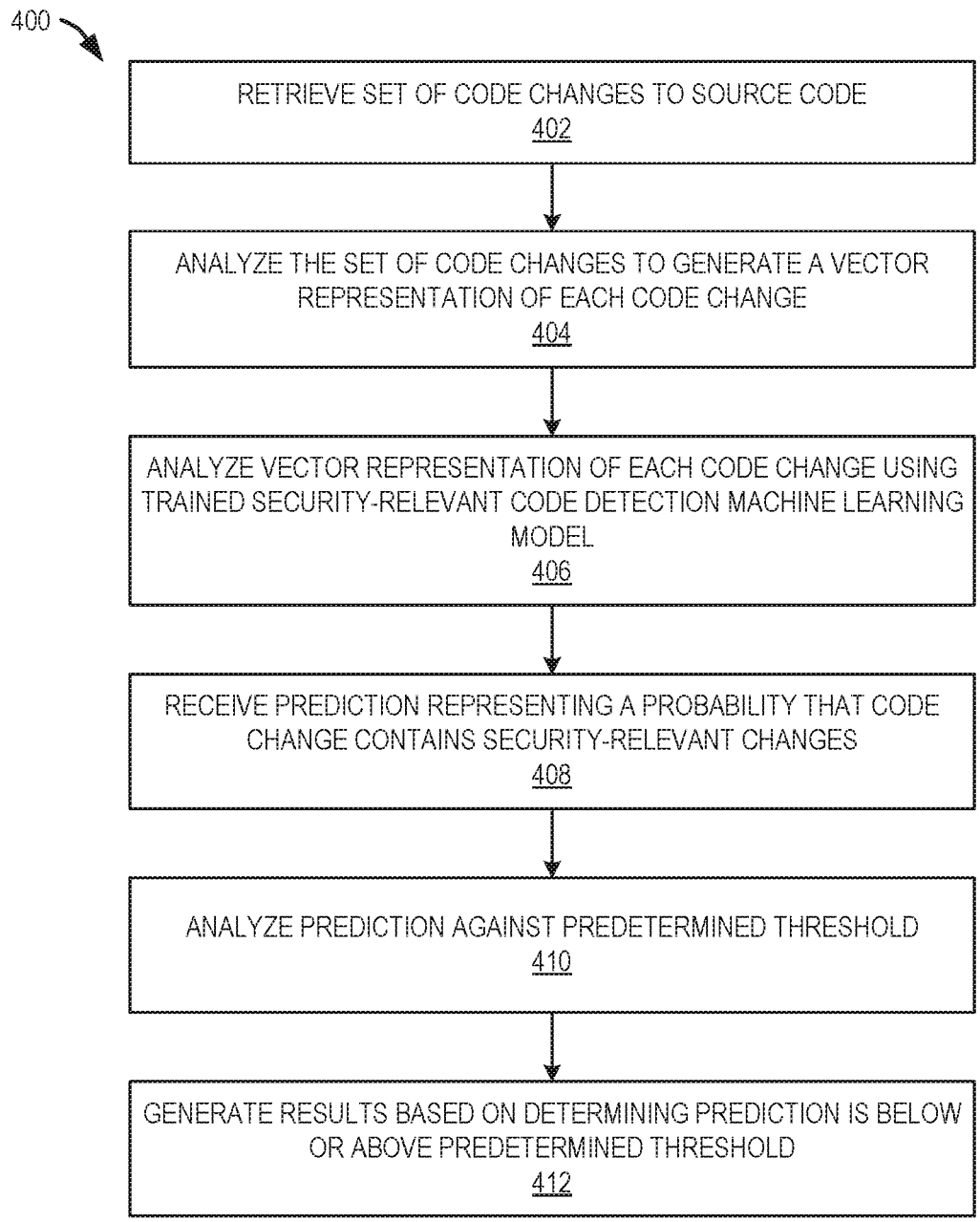
FIG. 4 is flowchart illustrating aspects of a method, according to some example embodiments.

FIG. 4 is a flow chart illustrating aspects of a method 400 for utilizing the trained security-relevant code detection machine learning model to generate results indicating whether or not a code change contains security-related changes, according to some example embodiments. For illustrative purposes, method 400 is described with respect to the networked system 100 of FIG. 1 and example block diagram in FIG. 2 illustrating the security-relevant code detection system 124. It is to be understood that method 400 may be practiced with other system configurations in other embodiments.

In operation 402, one or more processors retrieves a set of code changes to source code from a source code repository. In one example, a user may send a request via a computing device (e.g., client device 110) to analyze a specified set of code changes. In another example, the security-relevant code detection system 124 may periodically analyze all code changes made for one or more projects (e.g., open source projects) to determine whether any code changes are security relevant. For example, the security-relevant code detection system 124 may determine that a predetermined amount of time has passed since the last time code changes to the source code have been analyzed. Thus, the one or more processors may retrieve the set of code changes to source code from a source code repository in response to a request from a computing device, after determining a predetermined amount of time has passed since the last time code changes to the source code have been analyzed, and so forth.

In operation 404, the one or more processors analyze the set of code changes to generate a vector representation of each code change of the set of code changes. For example, the one or more processors may pre-process the code changes to tokenize the code changes (e.g., splitting up text into individual words), apply stemming (e.g., reduce words to their root, such as "build" for "builder," "building," etc.), apply lemmatization (e.g., determine a lemma of a word based on its intended meaning), and then generate a vector representation of the resultant words. These are just example methods of natural language processing and, in example embodiments, some, none, all, or other natural language processing methods may be used to pre-process the code changes so that a vector representation may be generated. The text processing methods or natural language processing methods may be defined in a pre-processing configuration file, which may be the same file used in the learning or training phase for the security-relevant code detection machine learning model 204. The output of the pre-processing may be passed to the classifier.

Figure 5:
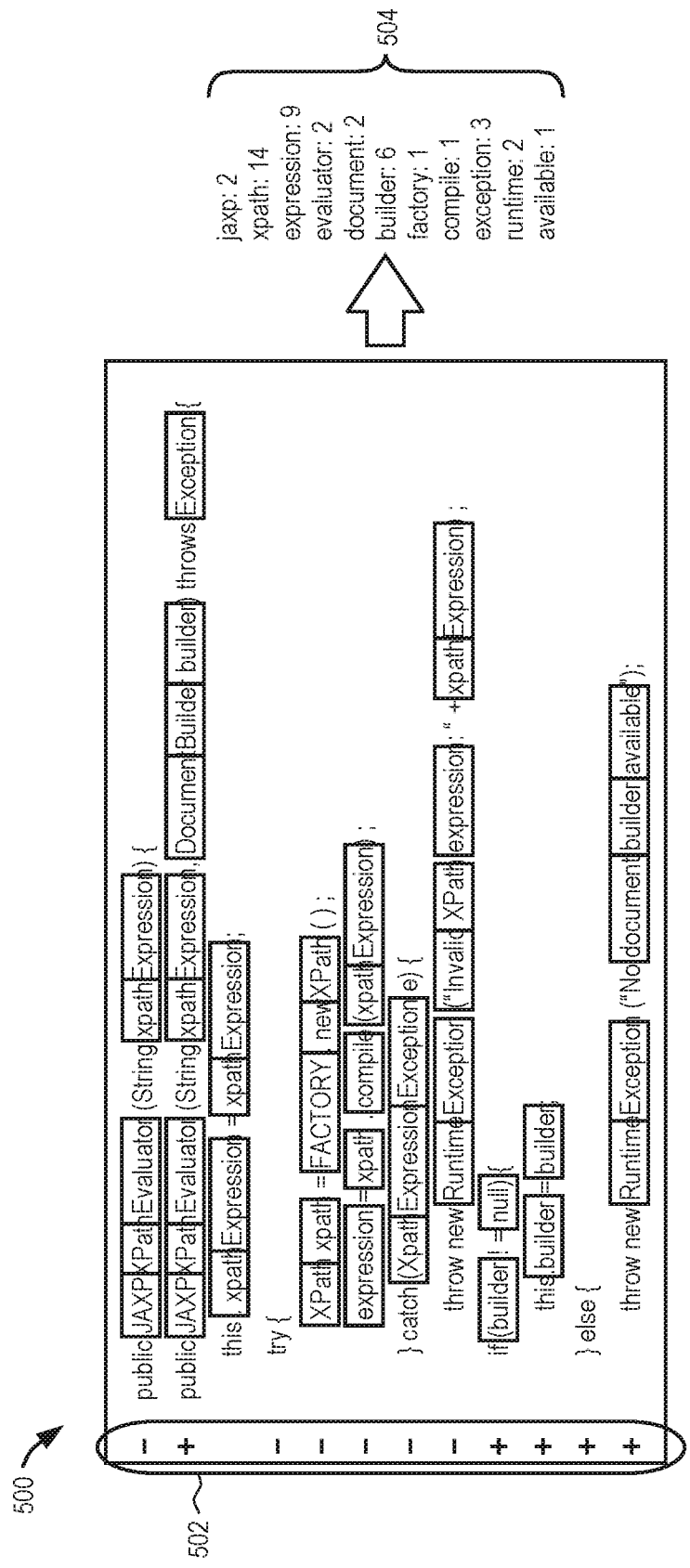
FIG. 5 illustrates an example of pre-processing of code changes made to source code, according to some example embodiments.

FIG. 5 illustrates an example 500 of pre-processing of codes changes (operation 402) made to source code. In the example in FIG. 5, the code changes include an indication 502 to show whether the code change was added ("+") to the source code or removed ("−") from the source code. Using this as an example, the one or more processors would treat the code changes as plain text and analyze the text of the code changes to extract a set of terms 504 (e.g., words) from the text of the code changes. The text is then represented in a vector space (e.g., via vectorizer 226 shown in FIG. 2). The vector space contains the terms that appear in the text that the system 124 will try to classify, and the number of times the terms appear. For example, the term "jaxp" appears two times in these code changes, the term "xpath" appears 14 times, and so forth. The set of terms 504 are just a simple example and do not represent a full vector of possible terms. For example, the actual full vector may contain thousands or tens of thousands of terms, but only a few of those terms occur in this example document of code changes.

The full vector space (that is, the complete dictionary of terms than can occur in a document) is determined by examining the entire set of documents in the training set. In such scan of the training set, as soon as a term is encountered the first time, it is added as a new dimension the vector space. The number of times it occurs in the corpus and how common it is across documents is stored as well; this information is used to compute relevance metrics (such as TF-IDF), which give higher weights to words that are specific to a document and lower weight to words that are common to many documents (e.g., articles, adverbs, prepositions, conjunctions). The filtering applied to each raw patch to represent it as a proper text document removes tokens and words that would pollute the vector space with meaningless dimensions. The full vector space may be periodically updated using new data during periodic retraining of the security-relevant code detection machine learning model 204. In one example, some words may actually be removed from the vector space, such as words that are very common or generic (e.g., would not convey any information useful to distinguish the security relevance of the change), such as "public." "if," "else," "throw," as examples.

In operation 406, the vector representation of each code change of the set of code changes is input into the trained security-relevant code detection machine learning model. In operation 408, the output from the trained security-relevant code detection machine learning model is received by the one or more processors. The output comprises a prediction representing a probability that each code change of the set of code changes contains security relevant changes. For example, the prediction may be a number between 0 and 1.

In operation 410, the one or more processors analyzes the prediction for each code change to determine whether the prediction is below or above a predetermined threshold. For example, a predetermined threshold may be 0.7, and thus, the one or more processors may compare the prediction results for each code change to determine if it is below or above 0.7. If it is below the threshold, it may be determined to be not security relevant, and if at or above the threshold, it may be determined to be security relevant.

In operation 412, the one or more processors generates results based on determining whether the prediction for each code change is below or above a predetermined threshold. The results may comprise an indication of whether or not code changes of the set of code changes contains security-relevant changes. The results may be provided to a computing device (e.g., client device 110) or used for further analysis.

Figure 6:
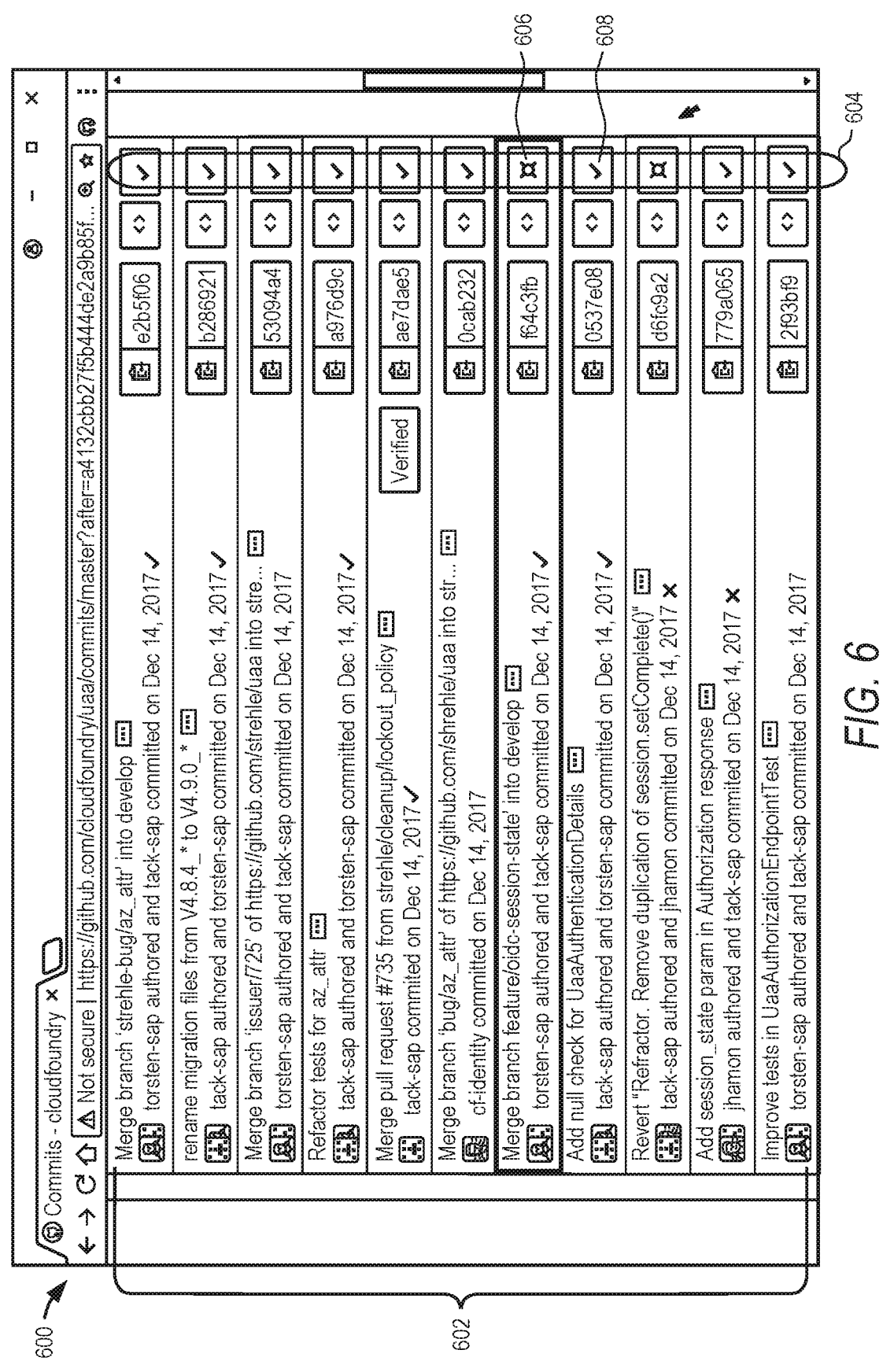

In one example, the results may be displayed in a user interface on a computing device, such as the example user interface 600 shown in FIG. 6. The example user interface 600 shows a list of code changes 602 (e.g., code fixes recently made to the source code or for a particular/requested time period). For each of the code changes in the list of code changes 602, the system determines whether or not each code change is security-relevant or not, as described above. This may be done in real-time as a user is scrolling through and viewing the list of code changes 602. The user interface may display an indication 604 of whether or not each code change in the list of code changes 602 is security-relevant or not. In this example, the code changes that are security relevant are indicated by a square and red circle 606, and the code changes that are not security relevant are indicated by a green checkmark 608.

Figure 7:
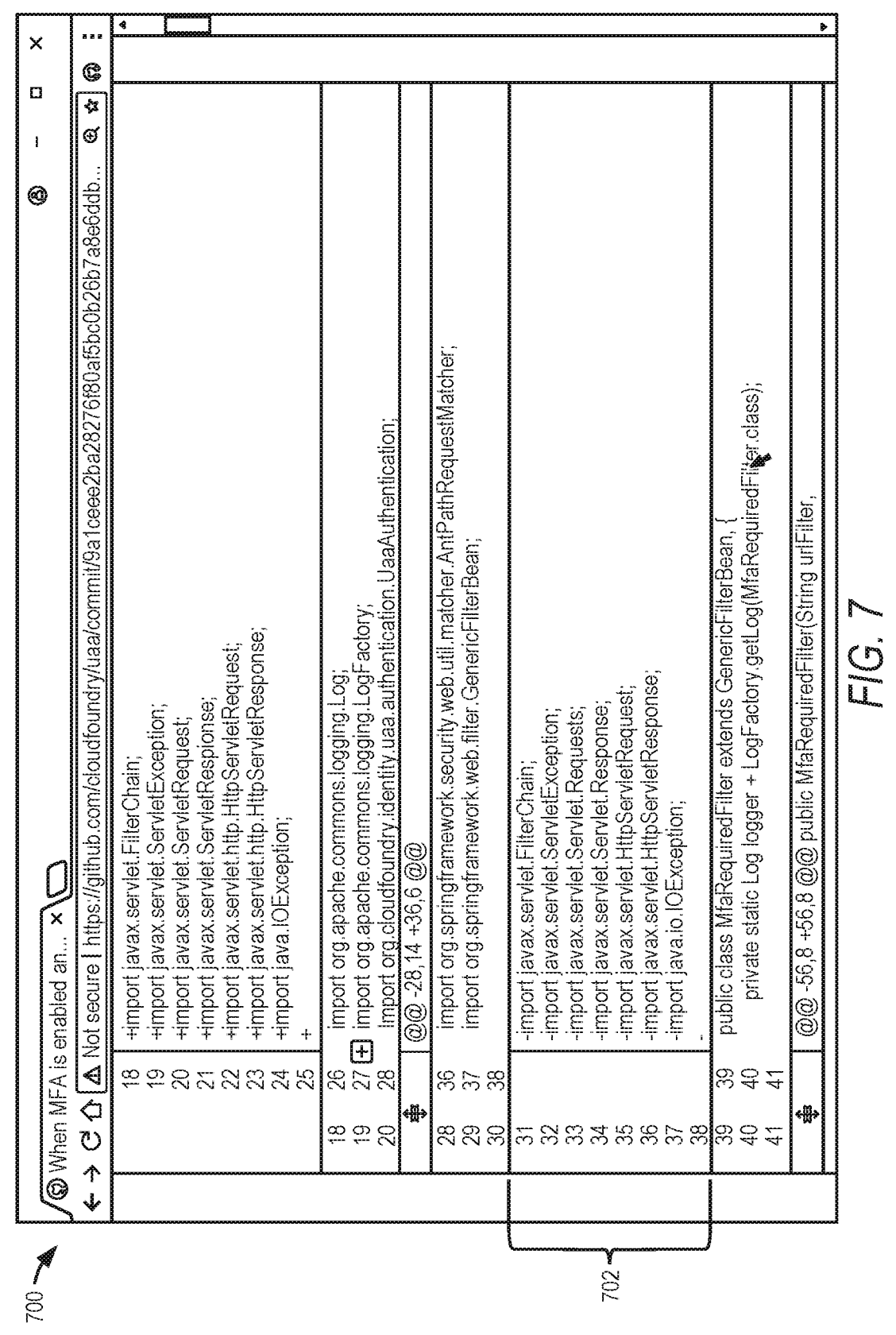

Example embodiments may further allow a user to select any of the code changes in the list of code changes 602 to see the specific changes in that code change that are security relevant. For example, after selecting a particular security code change, the computing device may display a user interface, such as the example user interface 700 shown in FIG. 7. The code in the user interface 700 may be color coded or otherwise indicate which lines are security related. For example, the lines that are security related (e.g., lines 702) may be highlighted in red.

Example embodiments may be applied in different usage scenarios, as described above, such as continuous monitoring of code repositories and automated analysis of known vulnerabilities, for example.

The current vulnerability disclosure process and the roll-out of security fixes has quite an unpredictable timing. There might be a fairly large time window between the moment a vulnerability becomes known to the public (e.g., because of discussions on mailing lists or bug tracking systems or just because a certain change is committed to a code repository) and the actual availability of a viable fix. A malicious party that examines the code commits in an open source project could infer the existence of a security issue and exploit it before a fix is available through standard distribution channels. It is well known that certain projects do not systematically disclose security issues; rather, they fix them silently. This can have a dramatic impact on the parties consuming (e.g., embedding) those components, because the urgency of updating to newer releases is underestimated, due to the absence of a specific warning about the security-relevance of the upgrade. Timeliness is key to ensuring that this possibility is prevented. By continuously monitoring code repositories using example embodiments, it is possible to be alerted immediately when such security-critical code changes are committed. Reactions include applying ad-hoc countermeasures, which include disabling the affected components, changing system configurations, applying ad-hoc patches manually, enforcing additional protection mechanisms, disallowing certain actions, and so on.

Advanced vulnerability analysis and management technologies (such as Vulas) rely on the availability of reliable information associating a vulnerability (CVE) to the code changes that where committed to the corresponding project repository in order to address that vulnerability. This kind of information is available only occasionally in the NVD, and often its quality is poor (e.g., wrong, incomplete, or inconsistent). As a consequence, vulnerability analysis demands a substantial amount of expert human effort and is not as fast as it should be. Example embodiments can play a key role in establishing systematically a correspondence between each CVE (or other vulnerability advisory) and the corresponding code changes.

Accordingly, example embodiments detect code changes to vulnerabilities that are known by analyzing the code itself. Existing approaches for analyzing commit messages to try and determine a security relevant fix results in inaccurate results since the commit messages do not always have information or details about all the changes made or about security-related changes that have been made. For example, a commit message about a fix or code change may simply say "optimizing loop," which is not very useful for determining whether there are any security-relevant changes made to the code.

The following examples describe various embodiments of methods, machine-readable media, and systems (e.g., machines, devices, or other apparatus) discussed herein.

Example 1

A computer-implemented method comprising: accessing, by one or more processors, a source code repository comprising a plurality of code changes to the source code;
extracting, by the one or more processors, the plurality of code changes from the source code repository;
converting, by the one or more processors, the plurality of code changes to generate labeled training data for training a security-relevant code detection machine learning model;
training, by the one or more processors, the security-relevant code detection machine learning model using a subset of the labeled training data to generate a trained security-relevant code detection machine learning model;
retrieving, by the one or more processors, a set of code changes to source code from the source code repository;
analyzing, by the one or more processors, the set of code changes to generate a vector representation of each code change of the set of code changes;
analyzing the vector representation of each code change of the set of code changes using the trained security-relevant code detection machine learning model;
receiving, by the one or more processors, a prediction from the security-relevant code detection machine learning model representing a probability that each code change of the set of code changes contains security-relevant changes;
analyzing, by the one or more processors, the prediction to determine whether the prediction is below or above a predetermined threshold; and
generating results based on determining whether the prediction is below or above the predetermined threshold.

Example 2

A method according to example 1, wherein converting the plurality of code changes to generate labeled training data comprises:
analyzing the plurality of code changes as text; and
performing natural language processing on the text.

Example 3

A method according to any of the previous examples, wherein performing natural language processing on the text comprises utilizing at least one method from a group of methods comprising: stemming, lemmatization, tokenizing, and stop-word filtering.

Example 4

A method according to any of the previous examples, wherein the results comprise an indication of whether or not each code change of the set of code changes contains security-relevant changes, and the method further comprises:
providing the results to be displayed in a user interface.

Example 5

A method according to any of the previous examples, wherein retrieving the set of code changes to source code from the source code repository is in response to a request from a client device for a specified set of code changes.

Example 6

A method according to any of the previous examples, wherein retrieving the set of code changes to source code from the source code repository is in response to determining that a predetermined amount of time has passed since code changes to the source code have been analyzed.

Example 7

A method according to any of the previous examples, wherein the set of code changes to source code are associated with one or more open source projects.

Example 8

A method according to any of the previous examples, wherein the subset of the labeled training data is a first subset of the labeled training data, and the method further comprises:
testing the trained security-relevant code detection machine learning model using a second subset of the labeled training data.

Example 9

A method according to any of the previous examples, wherein analyzing the set of code changes to generate the vector representation of each code change of the set of code changes comprises pre-processing each of the code changes using one or more text processing methods to generate the vector representation.

Example 10

A server computer comprising:
a memory that stores instructions; and
one or more processors configured by the instructions to perform operations comprising:

accessing a source code repository comprising a plurality of code changes to the source code;
extracting the plurality of code changes from the source code repository;
converting the plurality of code changes to generate labeled training data for training a security-relevant code detection machine learning model;
training the security-relevant code detection machine learning model using a subset of the labeled training data to generate a trained security-relevant code detection machine learning model;
retrieving a set of code changes to source code from the source code repository;
analyzing the set of code changes to generate a vector representation of each code change of the set of code changes;
analyzing the vector representation of each code change of the set of code changes using the trained security-relevant code detection machine learning model;
receiving a prediction from the security-relevant code detection machine learning model representing a probability that each code change of the set of code changes contains security-relevant changes;
analyzing the prediction to determine whether the prediction is below or above a predetermined threshold; and
generating results based on determining whether the prediction is below or above the predetermined threshold.

Example 11

A server computer according to any of the previous examples, wherein converting the plurality of code changes to generate labeled training data comprises:
analyzing the plurality of code changes as text; and
performing natural language processing on the text.

Example 12

A server computer according to any of the previous examples, wherein performing natural language processing on the text comprises utilizing at least one method from a group of methods comprising: stemming, lemmatization, tokenizing, and stop-word filtering.

Example 13

A server computer according to any of the previous examples, wherein the results comprise an indication of whether or not each code change of the set of code changes contains security-relevant changes, and the operations further comprise:
providing the results to be displayed in a user interface.

Example 14

A server computer according to any of the previous examples, wherein retrieving the set of code changes to source code from the source code repository is in response to a request from a client device for a specified set of code changes.

Example 15

A server computer according to any of the previous examples, wherein retrieving the set of code changes to source code from the source code repository is in response to determining that a predetermined amount of time has passed since code changes to the source code have been analyzed.

Example 16

A server computer according to any of the previous examples, wherein the set of code changes to source code are associated with one or more open source projects.

Example 17

A server computer according to any of the previous examples, wherein the subset of the labeled training data is a first subset of the labeled training data, and the operations further comprise:
testing the trained security-relevant code detection machine learning model using a second subset of the labeled training data.

Example 18

A server computer according to any of the previous examples, wherein analyzing the set of code changes to generate a vector representation of each code change of the set of code changes comprises pre-processing each of the code changes using one or more text processing methods to generate the vector representation.

Example 19

A non-transitory computer-readable medium comprising instructions stored thereon that are executable by at least one processor to cause a computing device to perform operations comprising:
accessing a source code repository comprising a plurality of code changes to the source code;
extracting the plurality of code changes from the source code repository;
converting the plurality of code changes to generate labeled training data for training a security-relevant code detection machine learning model;
training the security-relevant code detection machine learning model using a subset of the labeled training data to generate a trained security-relevant code detection machine learning model;
retrieving a set of code changes to source code from the source code repository;
analyzing the set of code changes to generate a vector representation of each code change of the set of code changes;
analyzing the vector representation of each code change of the set of code changes using the trained security-relevant code detection machine learning model;
receiving a prediction from the security-relevant code detection machine learning model representing a probability that each code change of the set of code changes contains security-relevant changes;
analyzing the prediction to determine whether the prediction is below or above a predetermined threshold; and
generating results based on determining whether the prediction is below or above a predetermined threshold.

Example 20

A non-transitory computer-readable medium according to any of the previous examples, wherein analyzing the set of code changes to generate the vector representation of each code change of the set of code changes comprises preprocessing each of the code changes using one or more text processing methods to generate the vector representation.

Figure 8:
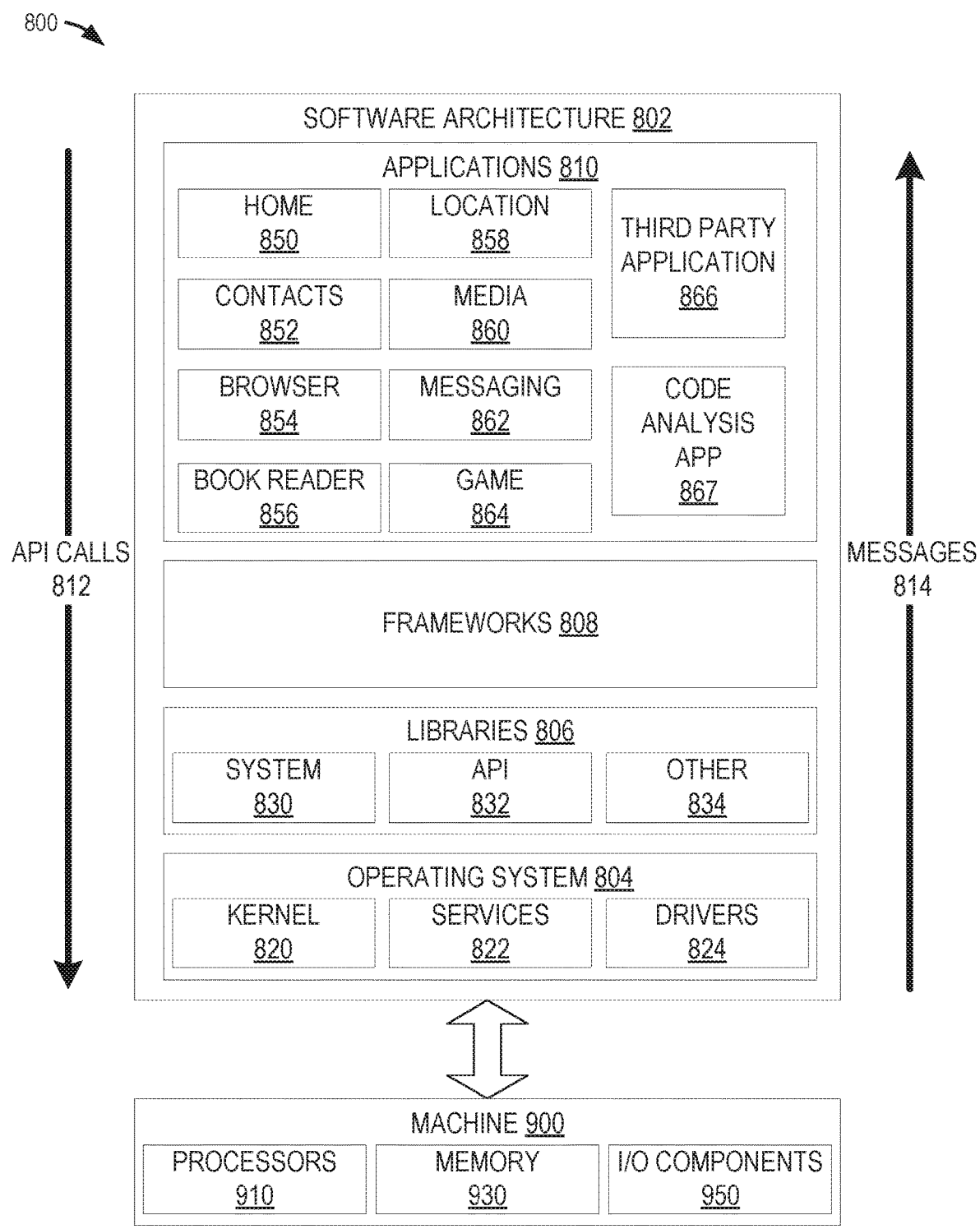
FIG. 8 is a block diagram illustrating an example of a software architecture that may be installed on a machine, according to some example embodiments.

FIG. 8 is a block diagram 800 illustrating software architecture 802, which can be installed on any one or more of the devices described above. For example, in various embodiments, client devices 110 and servers and systems 130, 102, 120, 122, and 124 may be implemented using some or all of the elements of software architecture 802. FIG. 8 is merely a non-limiting example of a software architecture, and it will be appreciated that many other architectures can be implemented to facilitate the functionality described herein. In various embodiments, the software architecture 802 is implemented by hardware such as machine 900 of FIG. 9 that includes processors 910, memory 930, and I/O components 950. In this example, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke application programming interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers). WI-FI® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4). Advanced Video Coding (H.264 or AVC), Moving Picture Experts Group Layer-3 (MP3), Advanced Audio Coding (AAC). Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphic user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java. or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Some embodiments may particularly include a code analysis application 867. In certain embodiments, this may be a stand-alone application that operates to manage communications with a server system such as third-party servers 130 or server system 102. In other embodiments, this functionality may be integrated with another application. The code analysis application 867 may request and display various data related to software (e.g., version information, metrics, fingerprint information, etc.) and may provide the capability for a user 106 to input data related to the objects via a touch interface, keyboard, or using a camera device of machine 900, communication with a server system via I/O components 950, and receipt and storage of object data in memory 930. Presentation of information and user inputs associated with the information may be managed by code analysis application 867 using different frameworks 808, library 806 elements, or operating system 804 elements operating on a machine 900.

Figure 9:
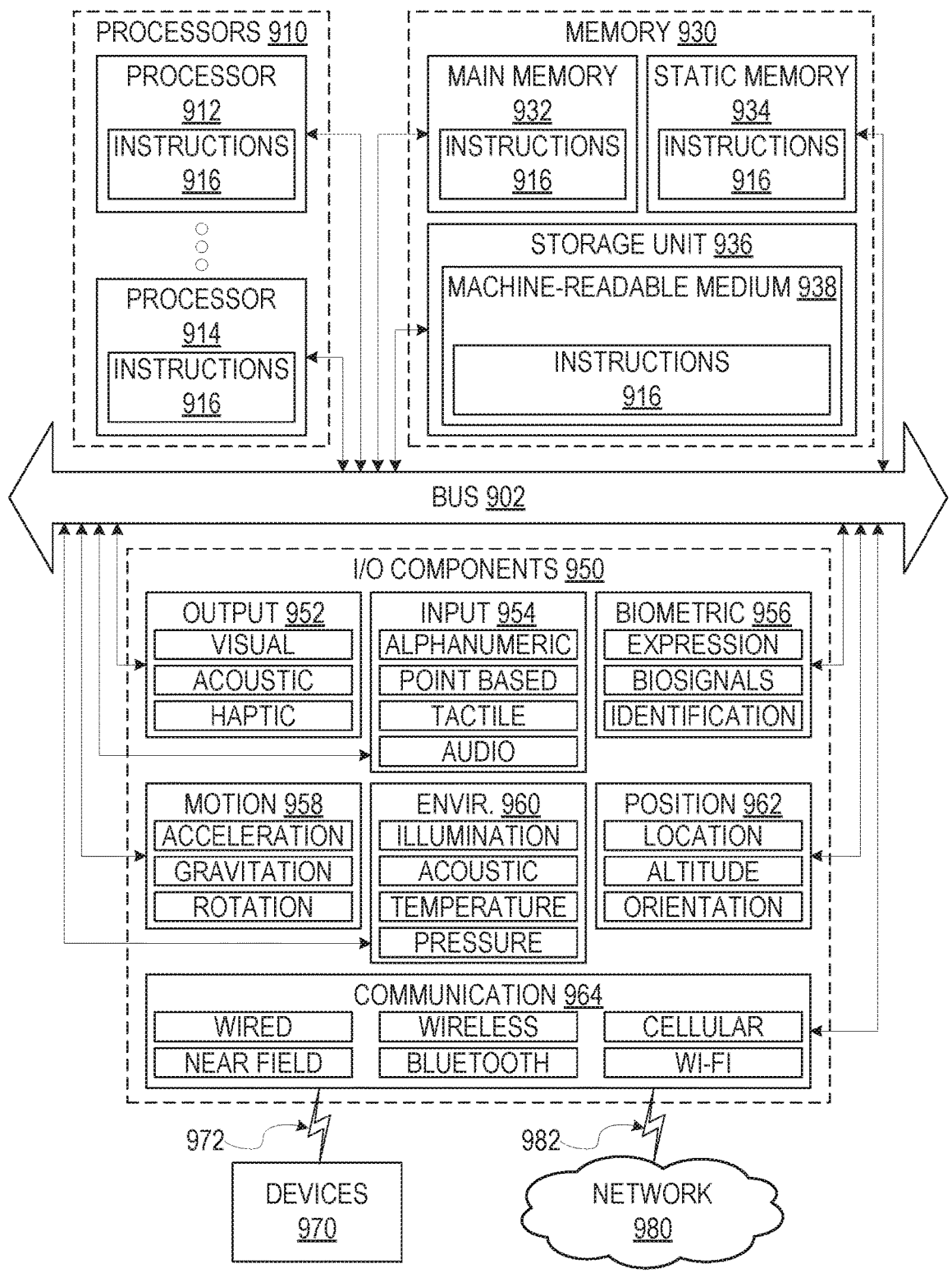
FIG. 9 illustrates a diagrammatic representation of a machine, in the form of a computer system, within which a set of instructions may be executed for causing the machine to perform any one or more of the methodologies discussed herein, according to an example embodiment.

FIG. 9 is a block diagram illustrating components of a machine 900, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application 810, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine 130, 102, 120, 122, 124, etc., or a client device 110 in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute instructions 916 contemporaneously. Although FIG. 9 shows multiple processors 910, the machine 900 may include a single processor 910 with a single core, a single processor 910 with multiple cores (e.g., a multi-core processor 910), multiple processors 912, 914 with a single core, multiple processors 912, 914 with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in an example embodiment, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, communication components 964 include wired communication components, wireless communication components, cellular communication components, near field communication (NFC) components. BLUETOOTH® components (e.g., BLUETOOTH® Low Energy). WI-FI® components, and other communication components to provide communication via other modalities. The devices 970 may be another machine 900 or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network a wireless network a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks. Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the medium 938 should be considered as being transportable from one physical location to another. Additionally, since the machine-readable medium 938 is tangible, the medium 938 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    accessing, by one or more processors, a source code repository comprising a plurality of code changes to source code of the source code repository;
    extracting, by the one or more processors, the plurality of code changes to the source code from the source code repository;
    converting, by the one or more processors, the plurality of code changes to generate labeled training data for training a security-relevant code detection machine learning model, the labeled training data comprising source code for each code change of the plurality of code changes and a corresponding label indicating whether or not each code change of the plurality of code changes is a security-relevant code change;
    training, by the one or more processors, the security-relevant code detection machine learning model using a subset of the labeled training data to generate a trained security-relevant code detection machine learning model;
    causing, by the one or more processors, display of a list of code changes of the plurality of code changes;
    as the list of code changes is being displayed, analyzing, by the one or more processors, the displayed list of code changes using natural language processing to generate resultant words for each code change of the displayed list of code changes to the source code;
    generating, by the one or more processors, a vector representation of each code change of the displayed list of code changes comprising the respective resultant words from the natural language processing;
    analyzing the vector representation of each code change of the displayed list of code changes using the trained security-relevant code detection machine learning model;
    receiving, by the one or more processors, a prediction from the security-relevant code detection machine learning model representing a probability that each code change of the displayed list of code changes contains a security-relevant code change;
    analyzing, by the one or more processors, the prediction to determine whether the prediction is below or above a predetermined threshold;
    causing display of a user interface element for each code change in the list of displayed code changes, the user interface element indicating whether the respective code change is security-relevant or not based on whether the prediction is above or below the predetermined threshold;
    determining that a predetermined amount of time has passed since code changes to the source code have been analyzed; and
    based on determining that a predetermined amount of time has passed since the last time code changes to the source code have been analyzed, performing operations comprising:
        retrieving a set of code changes to the source code from the source code repository;
        generating a vector representation of each code change of the set of code changes;
        analyzing the vector representation of each code change of the set of code changes using the trained security-relevant code detection machine learning model;
        receiving a prediction from the security-relevant code detection machine learning model representing a probability that each code change of the set of code changes contains a security-relevant code change;
        analyzing, by the one or more processors, the prediction to determine whether the prediction is below or above a predetermined threshold; and
        generating results based on determining whether the prediction is below or above the predetermined threshold.

2. The method of claim 1, wherein converting the plurality of code changes to generate labeled training data comprises:
    analyzing the plurality of code changes as text; and
    performing natural language processing on the text.

3. The method of claim 2, wherein performing natural language processing on the text comprises utilizing at least one method from a group of methods comprising: stemming, lemmatization, tokenizing, and stop-word filtering.

4. The method of claim 1, wherein causing display the list of code changes of the plurality of code changes is in response to a request from a client device for a specified set of code changes.

5. The method of claim 1, wherein the list of code changes to source code are associated with one or more open source projects.

6. The method of claim 1, wherein the subset of the labeled training data is a first subset of the labeled training data, and the method further comprises:
    testing the trained security-relevant code detection machine learning model using a second subset of the labeled training data.

7. The method of claim 1, wherein analyzing the list of code changes to generate the vector representation of each code change of the list of code changes comprises preprocessing each of the code changes using one or more text processing methods to generate the vector representation.

8. A server computer comprising:
    a memory that stores instructions; and
    one or more processors configured by the instructions to perform operations comprising:
        accessing a source code repository comprising a plurality of code changes to source code of the source code repository;
        extracting the plurality of code changes to the source code from the source code repository;
        converting the plurality of code changes to generate labeled training data for training a security-relevant code detection machine learning model, the labeled training data comprising source code for each code change of the plurality of code changes and a corresponding label indicating whether or not each code change of the plurality of code changes is a security-relevant code change;
        training the security-relevant code detection machine learning model using a subset of the labeled training data to generate a trained security-relevant code detection machine learning model;
causing display of a list of code changes of the plurality of code changes;
as the list of code changes is being displayed, analyzing the displayed list of code changes using natural language processing to generate resultant words for each code change of the displayed list of code changes to the source code;
generating a vector representation of each code change of the displayed list of code changes comprising the respective resultant words from the natural language processing;
analyzing the vector representation of each code change of the displayed list of code changes using the trained security-relevant code detection machine learning model;
receiving a prediction from the security-relevant code detection machine learning model representing a probability that each code change of the displayed list of code changes contains a security-relevant code change;
analyzing the prediction to determine whether the prediction is below or above a predetermined threshold;
causing display of a user interface element for each code change in the list of displayed code changes, the user interface element indicating whether the respective code change is security-relevant or not based on whether the prediction is above or below the predetermined threshold;
determining that a predetermined amount of time has passed since code changes to the source code have been analyzed; and
based on determining that a predetermined amount of time has passed since the last time code changes to the source code have been analyzed, performing operations comprising:
retrieving a set of code changes to the source code from the source code repository;
generating a vector representation of each code change of the set of code changes;
analyzing the vector representation of each code change of the set of code changes using the trained security-relevant code detection machine learning model;
receiving a prediction from the security-relevant code detection machine learning model representing a probability that each code change of the set of code changes contains a security-relevant code change;
analyzing, by the one or more processors, the prediction to determine whether the prediction is below or above a predetermined threshold; and
generating results based on determining whether the prediction is below or above the predetermined threshold.

9. The server computer of claim 8, wherein converting the plurality of code changes to generate labeled training data comprises:
analyzing the plurality of code changes as text; and
performing natural language processing on the text.

10. The server computer of claim 9, wherein performing natural language processing on the text comprises utilizing at least one method from a group of methods comprising: stemming, lemmatization, tokenizing, and stop-word filtering.

11. The server computer of claim 8, wherein causing display the list of code changes of the plurality of code changes is in response to a request from a client device for a specified set of code changes.

12. The server computer of claim 8, wherein the list of code changes to source code are associated with one or more open source projects.

13. The server computer of claim 8, wherein the subset of the labeled training data is a first subset of the labeled training data, and the operations further comprise:
testing the trained security-relevant code detection machine learning model using a second subset of the labeled training data.

14. The server computer of claim 8, wherein analyzing the list of code changes to generate a vector representation of each code change of the list of code changes comprises pre-processing each of the code changes using one or more text processing methods to generate the vector representation.

15. A non-transitory computer-readable medium comprising instructions stored thereon that are executable by at least one processor to cause a computing device to perform operations comprising:
accessing a source code repository comprising a plurality of code changes to source code of the source code repository;
extracting the plurality of code changes to the source code from the source code repository;
converting the plurality of code changes to generate labeled training data for training a security-relevant code detection machine learning model, the labeled training data comprising source code for each code change of the plurality of code changes and a corresponding label indicating whether or not each code change of the plurality of code changes is a security-relevant code change;
training the security-relevant code detection machine learning model using a subset of the labeled training data to generate a trained security-relevant code detection machine learning model;
causing display of a list of code changes of the plurality of code changes;
as the list of code changes is being displayed, analyzing the displayed list of code changes using natural language processing to generate resultant words for each code change of the displayed list of code changes to the source code;
generating a vector representation of each code change of the displayed list of code changes comprising the respective resultant words from the natural language processing;
analyzing the vector representation of each code change of the displayed list of code changes using the trained security-relevant code detection machine learning model;
receiving a prediction from the security-relevant code detection machine learning model representing a probability that each code change of the displayed list of code changes contains a security-relevant code change;
analyzing the prediction to determine whether the prediction is below or above a predetermined threshold;
causing display of a user interface element for each code change in the list of displayed code changes, the user interface element indicating whether the respective code change is security-relevant or not based on whether the prediction is above or below the predetermined threshold;

determining that a predetermined amount of time has passed since code changes to the source code have been analyzed; and based on determining that a predetermined amount of time has passed since the last time code changes to the source code have been analyzed, performing operations comprising:

retrieving a set of code changes to the source code from the source code repository;

generating a vector representation of each code change of the set of code changes;

analyzing the vector representation of each code change of the set of code changes using the trained security-relevant code detection machine learning model;

receiving a prediction from the security-relevant code detection machine learning model representing a probability that each code change of the set of code changes contains a security-relevant code change;

analyzing, by the one or more processors, the prediction to determine whether the prediction is below or above a predetermined threshold; and generating results based on determining whether the prediction is below or above the predetermined threshold.

16. The non-transitory computer-readable medium of claim 15, wherein analyzing the list of code changes to generate the vector representation of each code change of the list of code changes comprises pre-processing each of the code changes using one or more text processing methods to generate the vector representation.

17. The method of claim 1, further comprising:

receiving a selection of one code change in the displayed list of code changes; and in response to receiving the selection of the one code change, causing display of lines of code corresponding to the one code change with an indication of which lines of the code are security related.

18. The server computer of claim 8, the operations further comprising:

receiving a selection of one code change in the displayed list of code changes; and in response to receiving the selection of the one code change, causing display of lines of code corresponding to the one code change with an indication of which lines of the code are security related.

* * * * *